(12) United States Patent
Alexander et al.

(10) Patent No.: US 7,149,217 B2
(45) Date of Patent: Dec. 12, 2006

(54) LOAD-SHARING TECHNIQUE FOR DISTRIBUTING MULTI-PROTOCOL LABEL SWITCHING PROTOCOL ENCAPSULATED FLOWS ACROSS MULTIPLE PHYSICAL LINKS

(75) Inventors: Cedell Alexander, Durham, NC (US); Lance Richardson, Chapel Hill, NC (US); Olen Stokes, Morrisville, NC (US)

(73) Assignee: Extreme Networks, Santa Clara, CA (US)

( * ) Notice: Subject to any disclaimer, the term of this patent is extended or adjusted under 35 U.S.C. 154(b) by 1009 days.

(21) Appl. No.: 09/930,053

(22) Filed: Aug. 14, 2001

(65) Prior Publication Data
US 2004/0258073 A1    Dec. 23, 2004

(51) Int. Cl.
*H04L 12/28* (2006.01)
*H04L 12/56* (2006.01)

(52) U.S. Cl. .................. 370/392; 370/465; 370/400

(58) Field of Classification Search ............. 370/465, 370/389, 392, 395.1, 395.5, 400–401
See application file for complete search history.

(56) References Cited

U.S. PATENT DOCUMENTS

| | | | | |
|---|---|---|---|---|
| 6,408,001 | B1 * | 6/2002 | Chuah et al. | 370/392 |
| 6,760,327 | B1 * | 7/2004 | Manchester et al. | 370/364 |
| 6,967,937 | B1 * | 11/2005 | Gormley | 370/330 |

* cited by examiner

*Primary Examiner*—Chi Pham
*Assistant Examiner*—Ronald Abelson

(57) ABSTRACT

When Internet Protocol (IP) packets or Layer-2 MAC Protocol packets are encapsulated in a MultiProtocol Label Switching (MPLS) packet, one or more labels are assigned to identify the routers of the MPLS network through which the packet has passed. From this information, the underlying protocol (e.g., IP, MAC) can be inferred. In one embodiment, the value assigned to the one or more labels is selected to identify the underlying protocol. In one embodiment, IP packets have label values in a first range and MAC packets have label values in a second range. When the MPLS-encapsulated packets are switched within a load sharing environment, the ranges of the label values indicate the underlying protocol of the packet being switched. Knowing the underlying protocol enables a hash function to be selected that will both preserve packet ordering and effectively load share traffic received from a higher-speed source link across multiple lower-speed links.

26 Claims, 3 Drawing Sheets

LOAD-SHARING TECHNIQUE FOR DISTRIBUTING MULTI-PROTOCOL LABEL SWITCHING PROTOCOL ENCAPSULATED FLOWS ACROSS MULTIPLE PHYSICAL LINKS

FIELD OF THE INVENTION

The invention relates to data networking. More specifically, the invention relates to techniques for load sharing of Multi-Protocol Label Switching (MPLS) Protocol encapsulated data across multiple physical links.

BACKGROUND

It is common in the networking field for data from a high-speed source to be transferred across a lower-speed link. It may be desirable to distribute flows from the high-speed source across multiple lower-speed physical links in a load-sharing manner. The load sharing allows the multiple lower-speed links to simulate a higher-speed physical link. For example, data flows received from a high-speed packet over SONET (PoS) source may be distributed to multiple lower-speed Ethernet links.

Mapping of data from the high-speed source to the multiple lower-speed links is typically accomplished using a hashing function. Typically, the Point-to-Point Protocol (PPP) is run over the PoS link. However, mapping is further complicated by the potential for data flows to be transmitted according to different protocols. PPP, for example, can support two commonly used network control protocols known as the Internet Protocol Control Protocol (IPCP), which is used to transport IP packets, and the Bridging Control Protocol (BCP), which is used to transport Layer-2 MAC frames. In order to ensure that all of the packets for a given flow are transmitted on the same physical link to avoid potential problems associated with packet misordering, different hashing functions are used for the different protocols.

For example, the mapping, or hashing, function for the IP packets might operate on the 5-tuple {source IP address, destination IP address, IP protocol type, source port number, destination port number}, and the mapping function for MAC packets may operate on the pair {destination MAC address, source MAC address}. In a standard PPP environment, the determination of which hashing mechanism to use can be based on the Protocol ID field of the PPP header, which identifies the packet as an IP packet or an encapsulated MAC frame.

A problem exists when packets arriving from the PoS link are encapsulated according to the MultiProtocol Label Switching (MPLS) protocol. The problem exists because the Protocol ID field of the PPP header contains a value that indicates the packet is MPLS encapsulated, and therefore does not indicate the format/type of the encapsulated packet. On a PPP link, an MPLS encapsulated packet contains a MPLS shim header that immediately follows the PPP header. The shim header contains one or more labels (referred to as the label stack) that are used to switch the packet through the network. The labels may also be used to access a label database to determine the type of data carried by the packet. However, providing access to the label database for each component of the network switch that determines the type of data carried by a packet can be cumbersome and expensive.

Note that the situation is similar for other types of high-speed sources. For example, when the source is a 10 Gbps Ethernet interface and the lower-speed interfaces are 1 Gbps Ethernet links. In the case of an Ethernet source interface, the EtherType field in the Ethernet frame is analogous to the PPP Protocol ID field. The problem is the same in both cases (i.e., the EtherType field contains a value that indicates the packet is MPLS encapsulated, and therefore does not indicate the format/type of the encapsulated packet), and the solution presented for the PoS source is also directly applicable to an Ethernet source interface.

SUMMARY OF THE INVENTION

Techniques for load sharing of Multi-Protocol Label Switching (MPLS) Protocol encapsulated data across multiple physical links are described. A protocol format in which a packet is formatted is determined based on one or more label values in a header of a MultiProtocol Label Switching (MPLS) formatted packet, where label values in a first range indicate a first protocol type and label values in a second range indicate a second protocol type. A physical link is selected from a plurality of physical links based on the one or more label values.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for load sharing of Multi-Protocol Label Switching (MPLS) Protocol encapsulated data across multiple physical links are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

When Internet Protocol (IP) packets or Layer-2 MAC frames are encapsulated in a MultiProtocol Label Switching (MPLS) packet, one or more labels are assigned to identify the path through the MPLS network on which the packet is to be passed. From this information, the underlying protocol (e.g., IP, MAC) can be inferred. In one embodiment, the value assigned to the one or more labels is selected to identify the underlying protocol. In one embodiment, IP packets have label values in a first range and MAC packets have label values in a second range. For example, IP packet labels can be within the range 0 to 300 while MAC packet labels can be within the range of 301 to 600.

Figure 1:
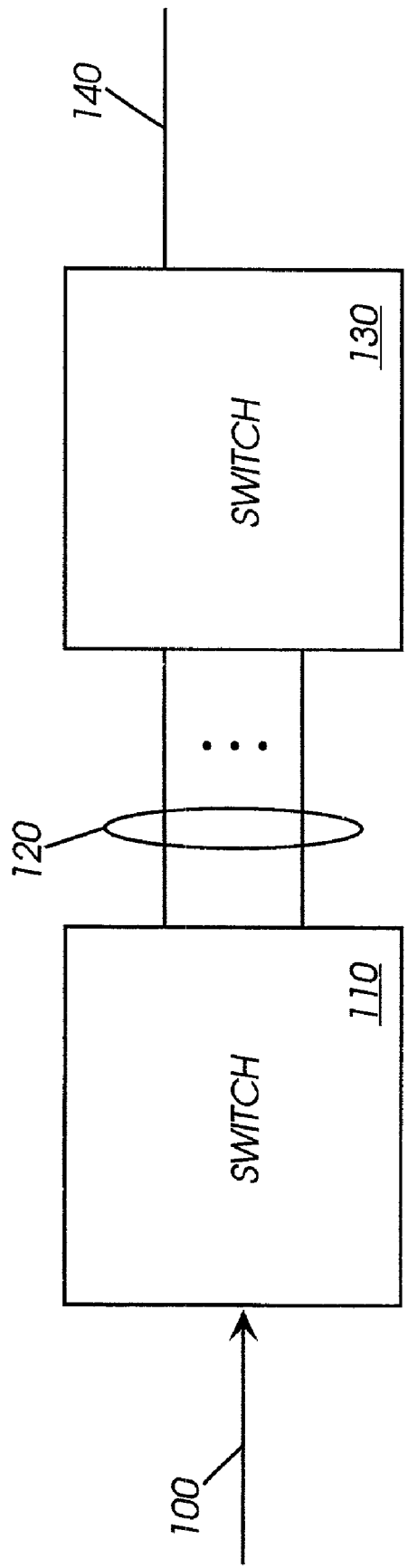
FIG. 1 illustrates one embodiment of load sharing between two switches.

FIG. 1 illustrates one embodiment of load sharing between two switches. Link 100 is a high-speed link, for example, a packet over SONET (PoS) link. SONET links are high-speed links (i.e., 51.840 Mbps and up) that carry data between switches. Switch 110 is coupled to link 100 to receive data from link 100 and transmit data over links 120 to switch 130. However, the links 120 provide lower individual bandwidth than link 100.

To implement load sharing and increase the data rate between switch 110 and switch 130, switch 110 can transmit data received from link 100 to switch 130 over multiple links 120. Generally, multiple links 120 are lower-speed links, for example, Ethernet. Because packet ordering can be important, each of the flows within the data stream should be mapped to the same physical link.

In the simple example of FIG. 1, switch 130 receives data over multiple links 120 and transmits the data over high-speed link 140. Other, more complex, data flow routing can also be supported using load sharing techniques. If switch 110 supports the Point-to-Point Protocol (PPP), a mapping function can be performed on the Protocol ID field within the PPP header. The value stored in the Protocol ID field indicates whether the packet is formatted as an Internet Protocol Control Protocol (IPCP) packet to encapsulate Internet Protocol (IP) frames or as a Bridging Control Protocol (BCP) packet to encapsulate Media Access Control (MAC) frames.

Because IPCP and BCP packets have different header structures, the information used to map IPCP and BCP traffic to physical links is different. In one embodiment, IPCP traffic is mapped using a hash function on the 5-tuple {source IP address, destination IP address, IP protocol type, source port number, destination port number} and BCP traffic is mapped using a hash function on the pair {destination MAC address, source MAC address}. Other hash or mapping functions can also be used. The result of the hash function is used to select a physical link on which the frame is transmitted.

When MultiProtocol Label Switching (MPLS) is used, the Protocol ID field of the PPP header does not indicate the protocol type of the packet. Therefore, a different mapping technique is required for MPLS traffic. Upon entry to a MPLS network, an additional header is added to the packet. The header includes one or more labels (also referred to as the label stack), which are values that represent one or more paths through the MPLS network.

MPLS networks include two types of routers: Label Edge Routers (LERs) and Label Switch Routers (LSRs). LERs include ingress LERs where the packet enters the MPLS network and egress LERs where the packet exits the MPLS network. The ingress LER generates the header with the one or more labels. The header is a shim header that follows the PPP header in which the Protocol ID field indicates that the packet is a MPLS packet. The path that the packet follows through the MPLS network is the Label Switched Path (LSP).

In order to infer the type of packet encapsulated within the MPLS packet, the values of the labels are partitioned into multiple ranges, each of which indicates a type of data protocol. In one embodiment, the ranges are: 0–299 for IP LER labels; 300–599 for MAC LER labels; and over 599 for LSR labels. In alternate embodiments, other ranges and/or a different number of ranges can be used. Because LSPs are unidirectional and each router selects the label values assigned to the LSP segments from which the routers receive packets, using different ranges for different types of packets can allow a LER to determine the type of packet that is received by analyzing the labels in the MPLS header. The embodiment illustrated in FIG. 1 is readily extensible to a configuration where switch 110 is an I/O module installed in switch 130, and links 120 are connections to the backplane of switch 130.

Figure 2:
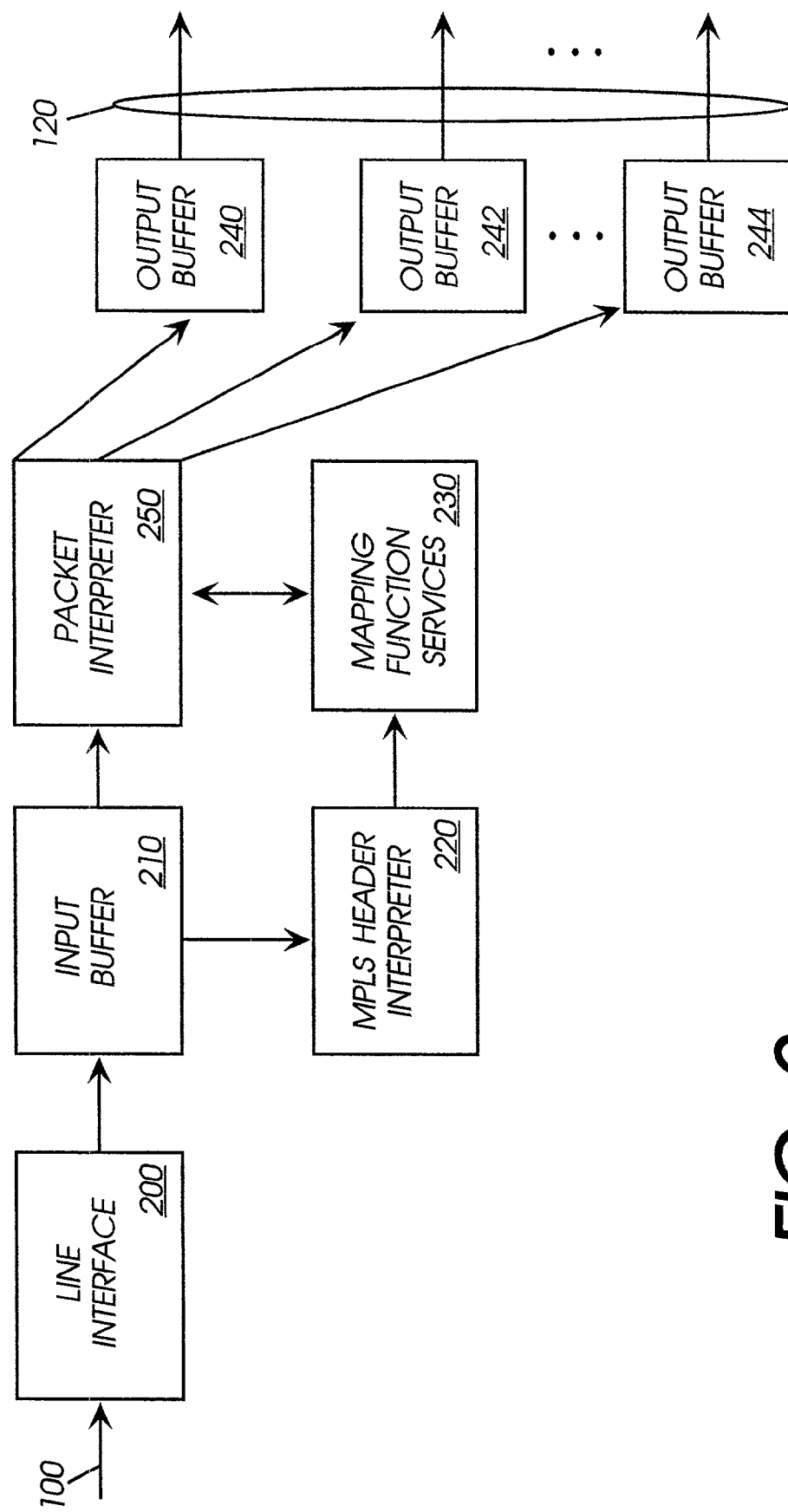
FIG. 2 is a block diagram of one embodiment of a switch that analyzes the header of a MPLS packet to determine the type of data encapsulated by the MPLS packet.

FIG. 2 is a block diagram of one embodiment of a switch that analyzes the header of a MPLS packet to determine the type of data encapsulated by the MPLS packet. Components of a switch other than those used to determine the type of data encapsulated by the MPLS packet have been omitted for reasons of simplicity.

Line interface 200 is coupled to receive data from link 100. Line interface 200 can be, for example, an optical to electrical converter than converts optical signals to electrical signals. Any type of line interface known in the art can be used. Input buffer 210 is coupled to receive data from line interface 200. Input buffer temporarily stores data prior to processing by other components of the switch.

MPLS header interpreter 220 is coupled to input buffer 210 to read the MPLS header and determine the label values within the MPLS header. MPLS header interpreter 220 also analyzes the label values to determine the type of packet encapsulated within the MPLS packet. MPLS header interpreter 220 can be implemented as hardware, software, or any combination of hardware and software. In one embodiment, MPLS header interpreter 220 processes the label values according to the following pseudo-code, which is described in greater detail below.

```
if (one label in MPLS shim header)
{
        if ((label is in IP Label Partition) || (label == 0))
                use IP hash on packet following label
        else if (label is in MAC Label Partition)
                use layer-2 hash on packet following label
        else // label is in LSR Label Partition
                use hash based on label
}
else // multiple labels in stack
{
        if (first label in stack is in IP Label Partition)
        {
                if (second label in stack is in MAC Label Partition &&
                is last label in stack)
                        use layer-2 hash on packet following label stack
                else if (second label in stack is in IP Label Partition &&
                is last label in stack)
                        use IP hash on packet following label stack
                else
                        use hash based on all labels in stack
        }
        else
                use hash based on all labels in stack
}
```

Mapping function services 230 performs the mapping function based on the result of the analysis performed by MPLS header interpreter 220. In one embodiment, MPLS header interpreter 220 sends a signal to mapping function services 230 indicating which mapping function (or hash function) to use with the associated packet. Based on the function to be used, mapping function services 230 can retrieve the appropriate header information to compute the mapping function. Mapping function services can be implemented as software, hardware or any combination of hardware and software.

Packet interpreter 250 is coupled to input buffer 210 and receives the packet and packet header from input buffer 210. Packet interpreter 250 provides header information to mapping function services 230 for use in performing the mapping functions. Mapping function services 230 provides packet interpreter 250 with the result of the mapping function. Packet interpreter 250 directs the packet to one of a set of output buffers (e.g., 240, 242, 244) based on the result of the mapping function. The output buffer transmits the packet across one of links 120.

In one embodiment, mapping function services 230 performs hash function on the 5-tuple {source IP address, destination IP address, IP protocol type, source port number, destination port number} for IP traffic; however, other mapping/hash values can also be used. In one embodiment, mapping function services 230 performs a hash function on the pair {destination MAC address, source MAC address} for MAC traffic; however, other mapping/hash values can also be used.

Figure 3:
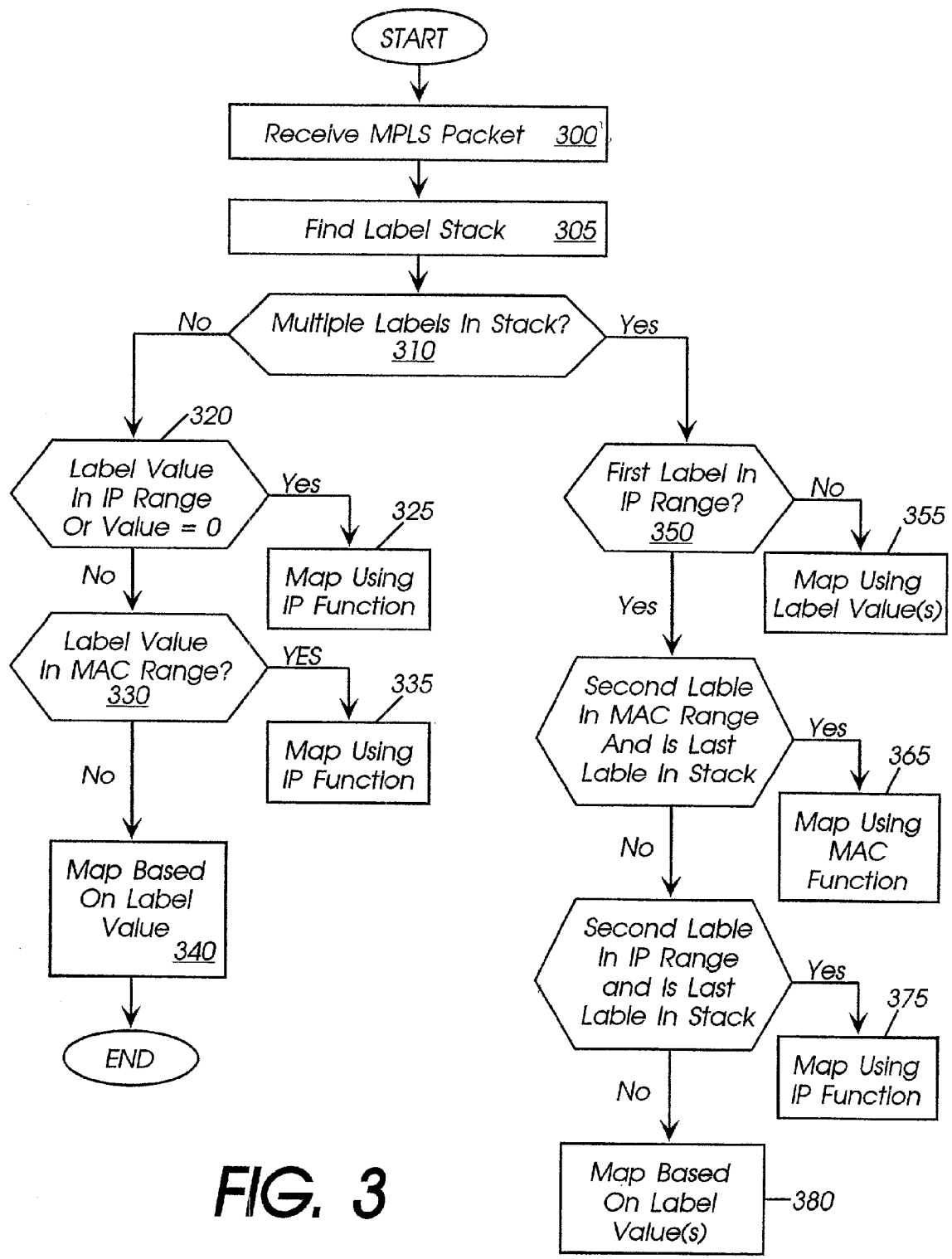
FIG. 3 is a flow diagram of one embodiment of a technique for mapping flows in a load sharing environment.

FIG. 3 is a flow diagram of one embodiment of a technique for mapping flows in a load sharing environment. A MPLS packet is received at 300. The MPLS packet includes headers according to multiple protocols. The MPLS header including the label stack is located at 305. The MPLS header interpreter determines whether the stack includes multiple labels at 310.

If the stack does not include multiple labels, the MPLS header interpreter determines whether the label value is within the IP LER label range at 320. The IP LER label range is a set of predetermined label values used to indicate that a packet is an IP packet. If the label is within the IP LER label range, the packet is mapped using the IP function at 325.

If the label value is not within the IP LER label range at 320, the MPLS header interpreter determines whether the label value is within the MAC LER label range at 330. If the label value is within the MAC LER label range at 330, the packet is mapped using the MAC function at 335. Otherwise, the packet is mapped based on the label value at 340.

By analyzing the label stack to determine the type of packet that is encapsulated in a MPLS packet, the MPLS header interpreter can perform a function that would otherwise require a label database. Thus, by storing a small number of values representing the relevant ranges rather than the full database, network switches can be made less complex and less expensive.

If, at 310, the MPLS header interpreter determines that the stack includes multiple levels, the MPLS header interpreter determines whether the first label is in the IP label range at 350. If the first label is not in the IP label range, the packet is mapped using the label values at 355.

If the first label is in the IP label range, the MPLS header interpreter determines whether the second label in the stack is in the MAC range and is the last label in the stack at 360. If the second label is in the MAC range and is the last label in the stack, the packet is mapped using the MAC function at 365.

If the second label is not in the MAC range or is not the last label in the stack, the MPLS header interpreter determines whether the second label in the stack is in the IP range and is the last label in the stack at 370; if so, the packet is mapped using the IP function at 375. If the second label in the stack is not in the MAC range, is not in the IP range, or is not the last label in the stack, the packet is mapped based on the label values at 380.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   determining a protocol format in which a packet is formatted based on one or more label values in a header of a MultiProtocol Label Switching (MPLS) formatted packet, wherein label values in a first range corresponding to a plurality of values indicate an encapsulated packet of a first network protocol type and label values in a second range corresponding to a plurality of values indicate an encapsulated packet of a second network protocol type, the MPLS label values to be used to switch the packet through a network;
   selecting a physical link from a plurality of physical links based on the one or more label values; and
   transmitting the packet over the selected physical link.

2. The method of claim 1 wherein the first protocol type comprises an Internet Protocol (IP) and the second protocol type comprises a Layer-2 MAC Protocol.

3. The method of claim 1 wherein selecting a physical link from a plurality of physical links based the one or more label values further comprises performing a hashing function on header field values, the hashing function and the header field values selected based on the one or more label values.

4. The method of claim 3 wherein performing a hashing function comprises performing a hash on one or more of a source IP address, a destination IP address, an IP type, a source port number, a destination port number, if the data carried by the packet is Internet Protocol (IP) formatted.

5. The method of claim 3 wherein performing a hashing function comprises performing a hash on one or more of a destination MAC address, a source MAC address, if the data carried by the packet is Layer-2 MAC Protocol formatted.

6. A network switch comprising:
   an ingress interface having one or more ports to receive network traffic from one or more external sources;
   an egress interface having one or more ports to transmit network traffic to one or more external destinations; and
   switching control circuitry coupled between the ingress interface and the egress interface, the switching control circuitry to analyze one or more labels in a header of a MultiProtocol Label Switching (MPLS) encapsulated packet received via one of the ports of the ingress interface, the switching control circuitry to determine an underlying protocol format in which the data of the MPLS encapsulated packet is formatted based on values stored in the one or more labels, wherein the MPLS label values are to be used to switch the packet through a network, the switching control circuitry further to select a physical link from the egress port over which the MPLS encapsulated packet is to be transmitted based on the one or more labels.

7. The network switch of claim 6 wherein values of the one or more labels correspond to a first range if the underlying protocol format is Internet Protocol (IP) formatted data and one or more of the label values correspond to a second range if the underlying protocol format is Layer-2 MAC Protocol formatted data.

8. The network switch of claim 6 wherein the switching control circuitry performs a hash on one or more of a source IP address, a destination IP address, an IP type, a source port number, a destination port number, if the data carried by the packet is Internet Protocol (IP) formatted.

9. The network switch of claim 6 wherein the switching control circuitry performs a hash on one or more of a destination MAC address, a source MAC address, if the data carried by the packet Layer-2 MAC Protocol formatted.

10. A network switch comprising:
an ingress interface having one or more ports to receive data from one or more external sources;
an egress interface having one or more ports to transmit data to one or more external destinations;
a backplane having multiple physical links coupled to the ingress interface and to the egress interface, the backplane to carry data between the ingress interface and the egress interface; and
switching control circuitry coupled to the ingress interface, the switching circuitry to analyze one or more labels in a header of a MultiProtocol Label Switching (MPLS) encapsulated packet received via one or the ports of the ingress interface, the switching control circuitry to determine an underlying network protocol format in which the data of the MPLS encapsulated packet is formatted based on whether values stored in the one or more labels correspond to a first plurality of values or a second plurality of values, the switching control circuitry further to select one or more physical links of the backplane over which the MPLS encapsulated packet is to be transmitted to the egress interface based on the one or more labels.

11. The network switch of claim 10 wherein values of the one or more labels correspond to a first range if the underlying protocol format is Internet Protocol (IP) formatted data and one or more of the label values correspond to a second range if the underlying protocol format is Layer-2 MAC Protocol formatted data.

12. The network switch of claim 10 wherein the switching control circuitry performs a hash on one or more of a source IP address, a destination IP address, an IP type, a source port number, a destination port number, if the data carried by the packet is Internet Protocol (IP) formatted.

13. The network switch of claim 10 wherein the switching control circuitry performs a hash on one or more of a destination MAC address, a source MAC address, if the data carried by the packet Layer-2 MAC Protocol formatted.

14. An apparatus comprising:
means for determining a protocol format in which a packet is formatted based on one or more label values in a header of a MultiProtocol Label Switching (MPLS) formatted packet, wherein label values in a first range corresponding to a plurality of values indicate an encapsulated packet of a first network protocol type and label values in a second range corresponding to a plurality of values indicate an encapsulated packet of a second network protocol type, the MPLS label values to be used to switch the packet through a network;
means for selecting a physical link from a plurality of physical links based on the one or more label values.

15. The apparatus of claim 14 wherein the first protocol type comprises an Internet Protocol (IP) and the second protocol type comprises a Layer-2 MAC Protocol.

16. The apparatus of claim 14 wherein the means for selecting a physical link from a plurality of physical links based the one or more label values further comprises means for performing a hashing function on header field values, the hashing function and the header field values selected based on the one or more label values.

17. An article comprising a machine-accessible medium having stored thereon sequences of instructions that, when executed, cause one or more electronic systems to:
determine a protocol format in which a packet is formatted based on one or more label values in a header of a MultiProtocol Label Switching (MPLS) formatted packet, wherein label values in a first range corresponding to a plurality of values indicate an encapsulated packet of a first network protocol type and label values in a second range corresponding to a plurality of values indicate an encapsulated packet of a second network protocol type, the MPLS label values to be used to switch the packet through a network; and
select a physical link from a plurality of physical links based on the one or more label values.

18. The article of claim 17 wherein the first protocol type comprises an Internet Protocol (IP) and the second protocol type comprises a Layer-2 MAC Protocol.

19. The article of claim 17 wherein the sequences of instructions that cause the one or more electronic systems to select a physical link from a plurality of physical links based the one or more label values further comprises sequences of instructions that, when executed, cause the one or more electronic systems to perform a hashing function on header field values, the hashing function and the header field values selected based on the one or more label values.

20. The article of claim 19 wherein the sequences of instructions that cause the one or more electronic systems to perform a hashing function comprises sequences of instructions that, when executed, cause the one or more electronic systems to perform a hash on one or more of a source IP address, a destination IP address, an IP type, a source port number, a destination port number, if the data carried by the packet is Internet Protocol (IP) formatted.

21. The article of claim 19 wherein the sequences of instructions that cause the one or more electronic systems to perform a hashing function comprises sequences of instructions that, when executed, cause the one or more electronic systems to perform a hash on one or more of a destination MAC address, a source MAC address, if the data carried by the packet is Layer-2 MAC Protocol formatted.

22. A network data signal embodied in a data communications medium shared among a plurality of network devices comprising sequences of instructions that, when executed, cause one or more electronic systems to:
determine a protocol format in which a packet is formatted based on one or more label values in a header of a MultiProtocol Label Switching (MPLS) formatted packet, wherein label values in a first range corresponding to a plurality of values indicate an encapsulated packet of a first network protocol type and label values in a second range corresponding to a plurality of values indicate an encapsulated packet of a second network protocol type, the MPLS label values to be used to switch the packet through a network; and
select a physical link from a plurality of physical links based on the one or more label values.

23. The network data signal of claim 22 wherein the first protocol type comprises an Internet Protocol (IP) and the second protocol type comprises a Layer-2 MAC Protocol.

24. The network data signal of claim 22 wherein the sequences of instructions that cause the one or more electronic systems to select a physical link from a plurality of physical links based the one or more label values further comprises sequences of instructions that, when executed, cause the one or more electronic systems to perform a hashing function on header field values, the hashing function and the header field values selected based on the one or more label values.

25. The network data signal of claim 24 wherein the sequences of instructions that cause the one or more electronic systems to perform a hashing function comprises sequences of instructions that, when executed, cause the one or more electronic systems to perform a hash on one or more of a source IP address, a destination IP address, an IP type, a source port number, a destination port number, if the data carried by the packet is Internet Protocol (IP) formatted.

26. The network data signal of claim 24 wherein the sequences of instructions that cause the one or more electronic systems to perform a hashing function comprises sequences of instructions that, when executed, cause the one or more electronic systems to perform a hash on one or more of a destination MAC address, a source MAC address, if the data carried by the packet is Layer-2 MAC Protocol formatted.

* * * * *